(No Model.)

B. EDGAR.
LOCK NUT.

No. 602,232.  Patented Apr. 12, 1898.

Witnesses
J. G. Hinkel
William E. Neff

Butler Edgar, Inventor
Watson & Watson, Attorneys

UNITED STATES PATENT OFFICE.

BUTLER EDGAR, OF SUNBURY, PENNSYLVANIA, ASSIGNOR TO THOMAS M. RIGHTER, TRUSTEE, OF MOUNT CARMEL, PENNSYLVANIA.

LOCK-NUT.

SPECIFICATION forming part of Letters Patent No. 602,232, dated April 12, 1898.

Application filed August 26, 1897. Serial No. 649,617. (No model.)

*To all whom it may concern:*

Be it known that I, BUTLER EDGAR, a citizen of the United States, residing at Sunbury, in the county of Northumberland and State of Pennsylvania, have invented certain new and useful Improvements in Lock-Nuts, of which the following is a specification.

The object of my improved invention is to produce a self-locking nut which is cheap and of simple and durable construction and which will remain in any desired position upon a bolt without any tendency to become loose or to rattle.

To these ends the invention consists in a nut having a slit or kerf in its side, said kerf being parallel or substantially parallel with the faces of the nut and the portion above the kerf being set inwardly, whereby the upper portion of the hole in the nut is slightly flattened, one of its diameters being slightly longer and another slightly shorter than the diameter of the bolt for which the nut is adapted. The set-in portion of the nut is suitably proportioned, so that it will yield as it is screwed upon the bolt, but is heavy enough to grip the bolt with a strong spring-pressure. My invention is illustrated in the accompanying drawings, in which—

Figure 1:
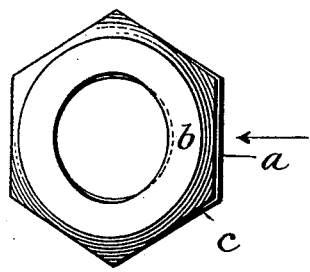
Figure 2:
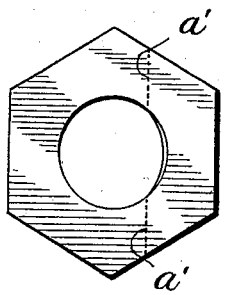
Figure 3:
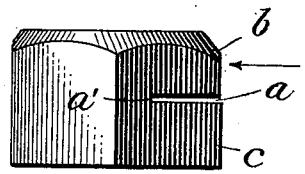

Figure 1 is a top plan view of a nut constructed in accordance with the invention. Fig. 2 is a bottom plan view, and Fig. 3 is a side view.

To illustrate my invention, I have shown a hexagonal nut of the form customarily used upon rail-joints. It will be understood, however, that the invention is applicable to other forms of nuts and to nuts which are adapted for other purposes.

In constructing my improved lock-nut I first form the cylindrical hole in the nut and tap it with a thread in the ordinary manner. A kerf $a$ is then formed in the side of the nut substantially parallel to the upper and lower faces and preferably about one-third way through the nut, as shown in the drawings, the dotted line $a'$ indicating the inner edge of the kerf or slit. The portion $b$ above the kerf $a$ is then subjected to a blow or to pressure in the direction of the arrow shown in Figs. 1 and 3, and thus squeezed or set inwardly to a slight extent. This has the effect of reducing the diameter in the direction of the arrow and increasing the diameter at right angles to this direction, giving the upper part of the opening a slightly-flattened form. This set should not be sufficient to prevent the upper part of the nut from readily engaging the threads of the bolt, while at the same time it should be sufficient to make the upper part of the nut grip the bolt quite forcibly. The portion $b$ need not bear any definite proportion to the full depth of the nut. It should be thin enough to enable the set-in portion to yield when the nut is screwed onto a bolt, such portion then being partially restored to its original circular form. The portion $c$ below the kerf is not affected by the operation on the upper portion, and therefore the lower part of the hole remains perfectly round, so that the nut can be readily started upon the bolt. There is no distortion of the threads in the direction of the axis of the nut, and hence they always match perfectly with the bolt-threads.

Having described my invention, what I claim, and desire to secure by Letters Patent, is—

A self-locking nut, having a kerf in one side partially severing it on a plane substantially parallel with its upper and lower faces and having the portion above said kerf set inward, the portion of the hole in the nut below the kerf being circular and the portion above being reduced in one of its diameters, whereby the set-in portion is adapted to grip the bolt, substantially as described.

In testimony whereof I affix my signature in presence of two witnesses.

BUTLER EDGAR.

Witnesses:
JAMES A. WATSON,
WILLIAM E. NEFF.